United States Patent [19]
Johnson

[11] 3,755,135
[45] Aug. 28, 1973

[54] ELECTRIC DEMINERALIZING APPARATUS

[76] Inventor: Allan M. Johnson, 7423 Balcolm Ave., Reseda, Calif. 91335

[22] Filed: Jan. 20, 1971

[21] Appl. No.: 107,997

[52] U.S. Cl............ 204/301, 204/180 P, 204/180 B
[51] Int. Cl............................................. B01d 13/02
[58] Field of Search..................... 204/180 P, 180 B, 204/301

[56] References Cited
UNITED STATES PATENTS

| | | | |
|---|---|---|---|
| 2,763,607 | 9/1956 | Staverman | 204/180 B X |
| 2,788,319 | 4/1957 | Pearson | 204/180 B X |
| 3,135,674 | 6/1964 | Ruetschi | 204/180 P X |
| 3,515,664 | 6/1970 | Johnson et al. | 204/180 P X |
| 3,553,092 | 1/1971 | Muno et al. | 204/180 P |

Primary Examiner—John H. Mack
Assistant Examiner—A. C. Prescott
Attorney—Robert E. Geauque

[57] ABSTRACT

An electric demineralizing apparatus and method in which porous electrodes of the same composition are located in compartments on opposite sides of an ion permeable membrane and the electrolyte flows through the electrodes and along the membrane. When a D.C. potential is applied across the electrodes, waste water is produced in one compartment and product water is produced in the other compartment. The D.C. power source drives electrons into one set of electrodes and extracts electrons from the other set of electrodes.

18 Claims, 6 Drawing Figures

ALLAN M. JOHNSON
INVENTOR.

BY R. E. Granger
ATTORNEY

ELECTRIC DEMINERALIZING APPARATUS

BACKGROUND OF THE INVENTION

A number of processes have been utilized for the demineralizing of water, such as distillation, freezing, electrodialysis and reverse osmosis. The electrodialysis process uses a large chamber divided into compartments by thin plastic sheets or membranes. Two types of membranes are used, and they are placed alternately. One type allows only positive ions to pass through and the other lets only negative ions through. A positive electrode and a negative electrode are placed in compartments on opposite sides of the demineralizing compartment and connected across a source of electrical potential. When an electric current is sent through the water, the negative ions are drawn through the negative ion permeable membranes toward the positive electrode and the positive ions are drawn through the positive ion permeable membranes toward the negative electrode. Fresh water is produced in alternate compartments between the electrode compartments. In U.S. Pat. No. 3,515,664, assigned to the same assignee, the fluid electrolyte flows through permeable electrodes which are alternately anion and cation collecting electrodes, insulated from one another by porous separations. The electrodes can consist of carbon granules coated with an ion exchange material in fluid form which is polymerized to render the material insoluble. The adjacent electrodes are oppositely charged from a reversible source of direct current.

SUMMARY OF THE INVENTION

The present invention relates to an electric demineralizing apparatus and method in which porous electrodes of the same composition are located on opposite sides of an ion permeable membrane. The electrodes can be of the same composition as those described in U.S. Pat. No. 3,515,664, or the electrodes can be prepared by another process disclosed herein, and the membrane can be either a positive ion or negative ion permeable membrane of the kinds utilized in electrodialysis. The electrolyte flows through the electrodes along the membrane and when a potential is applied across the electrodes, brine is produced at one electrode and product water is produced at the other electrode. It is preferred to utilize an anion permeable membrane to separate cation responsive electrodes since an anion responsive electrode has a tendency to degrade toward the cation form. However, a suitable apparatus can utilize anion responsive electrodes separated by a cation permeable membrane.

The electrodes can be arranged in a stack and separated by a plurality of membranes, with all even numbered electrodes connected electrically in parallel and all alternate (odd numbered) electrodes also connected in parallel. Manifolding is required to flow one electrolyte stream through the even numbered electrodes and a separate stream through the odd numbered electrodes.

In operation, the external power supply drives electrons into one set of electrodes and extracts electrons from the other set of electrodes. When the electrodes are cation responsive, the first set adsorbs positively charged ions (cations) and the second set desorbs an equivalent number of cations. Electroneutrality is maintained by a flow of negatively charged ions (anions) through the anion permeable membrane. The interstitial water of the first set of electrodes is desalted (demineralized) while the mineralization of the water of the second set is increased. After a suitable period of time during which the respective streams of water through the two water manifold systems are disposed of, the electric current is caused to be reversed, and the process is repeated with a corresponding reversal of the desalting effects of the two streams.

The transfer of one electron removes both a cation and an anion from the product stream and adds an equivalent pair to the waste stream whereas in the process of U.S. Pat. No. 3,515,664, the transfer of two electrons are required to produce the same results. Thus, one electron in the present invention is used twice as effectively.

DESCRIPTION OF THE PREFERRED EMBODIMENT

Figure 1:
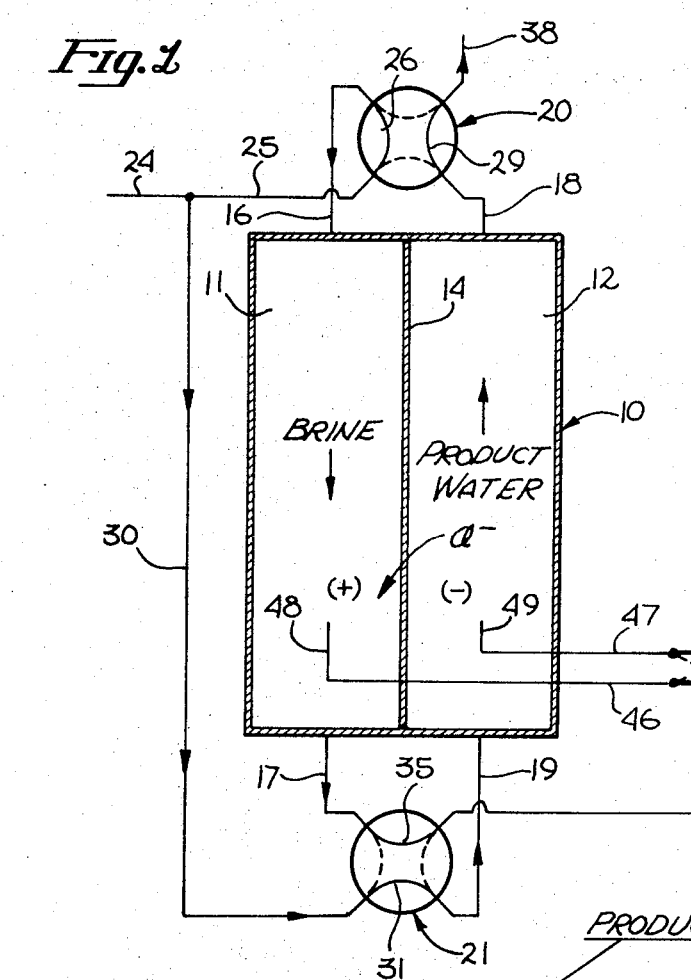
FIG. 1 is a diagrammatic illustration of a basic apparatus utilizing two similar electrodes on opposite sides of an ion permeable membrane.

Referring to FIG. 1, container 10 is divided into compartments 11 and 12 by means of an ion permeable membrane 14. Preferably, the compartments 11 and 12 each contain a permeable cation responsive (collecting) carbon electrode and the membrane 14 is permeable to anions but not to cations. Two passages 16 and 17 connect to opposite ends of compartment 11 and two passages 18 and 19 connect to opposite ends of compartment 12. Passages 16 and 18 connect to four-way valve 20 and passages 17 and 19 connect to four-way valve 21. The supply of raw, brackish water in passage 24 is connected to valve 20 by branch passage 25 and valve passage 26 connects passage 25 to passage 16 when valve 20 is in the illustrated full line position. A second branch passage 30 connects the raw water supply to passage 19 through passage 31 of valve 21 when the valve is in the illustrated full line position.

Passage 17 connects the fluid discharged from compartment 11 to outlet passage 34 through valve passage 35 and passage 18 connects the fluid discharged from compartment 12 with outlet passage 38 through valve passage 29.

A direct current power supply 44 is connected through reversible switch 45 to leads 46 and 47 terminating in wires 48 and 49, respectively, which serve to supply and distribute the electric current to the electrodes. In the position of the switch shown in FIG. 1, the wire 48 is connected to the positive side of current supply 44 and wire 49 is connected to the negative side. In the alternate position of the switch, the polarity of wires 48 and 49 is reversed.

Figure 2:
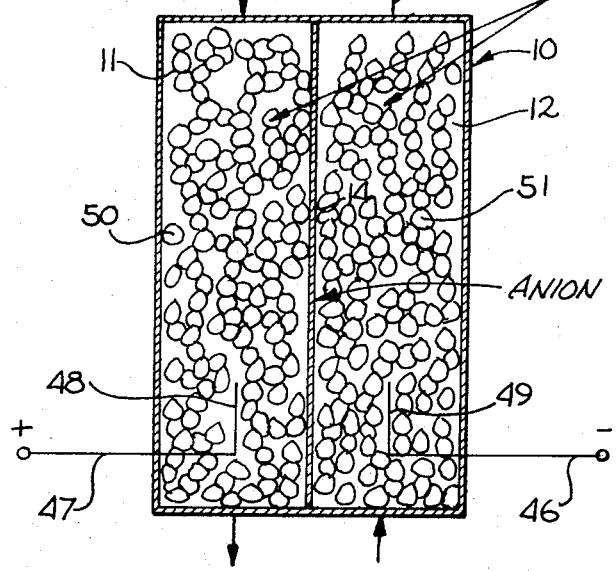
FIG. 2 is a schematic illustration of a basic apparatus showing two electrodes formed of cation responsive carbon particles and an anion permeable membrane therebetween.

In FIG. 2, the compartments 11 and 12 are shown filled with coated carbon particles 50 and 51, respectively, forming the cation responsive carbon electrode in each compartment. The particles are sufficiently packed to be electrically conductive and yet permit the passage of fluid from one end of the compartment to the other. Any sufficiently porous carbon can be used instead of granular carbon in each electrode compartment and the carbon may or may not be chemically treated to enhance its affinity for cations and may or may not have cation permeable materials deposited within the micropores and upon the extensive surface of the carbon. A treatment of carbon particles to produce cation and anion responsive electrode materials is described in said U.S. Pat. No. 3,515,664 and comprises applying cation and anion responsive material in fluid form and then effecting their polymerization on the carbon particles. However, any suitable treatment may be used for granular or porous carbon, or untreated carbon can be used. For instance, cation responsive carbon can be prepared by a two-step process, the first step being carboxylation (or sulfonation) of the extensive carbon surface and the second step consisting of filling the pore volume of the carbon with a strongly ionized cation exchange resin.

The first step can be accomplished by oxidizing the carbon surfaces using a hot mixture of concentrated sulfuric and nitric acids. This procedure will produce weak acidic carboxylic surface compounds which will in turn: produce a positive charge on the surfaces, reducing the tendency to adsorb anions; enable the electrode to transform farodaic currents associated with electrolysis of water into cation responsiveness by buffering the resulting pH effects; and also by means of buffering capacity, to eliminate deleterious effects such as pH induced precipitation of insoluble carbonates.

The second step can be accomplished by first filling the pores of previously dried carbon with phenolsulfonic acid after which formaldehyde, or successively epichlorohydrin then formaldehyde, can be added prior to curing at elevated temperature. This procedure results in filling the pore volume with a cross linked resin which is permeable to cations but not to anions. Thus the carbon is made cation responsive. Additionally, the resin filled pores are provided with a permanent supporting electrolyte which enhances the current carrying capability when operating in waters of low salinity.

Figure 3:
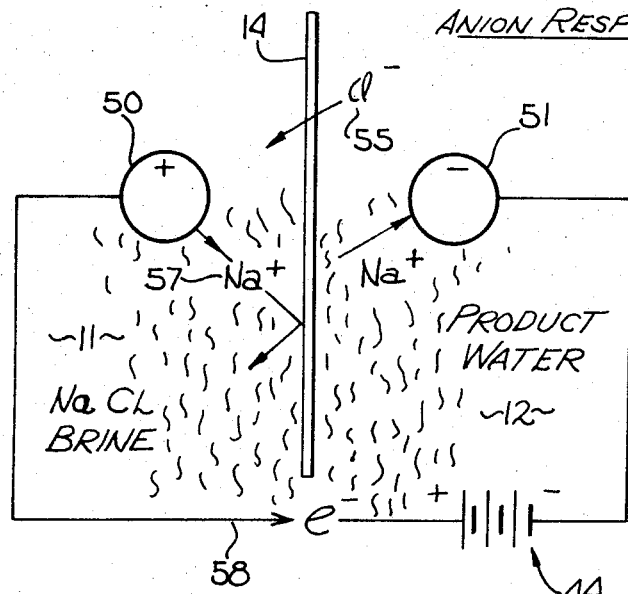
FIG. 3 is a schematic illustration of the electron exchange between the electrodes.

The electron flow is schematically illustrated in FIG. 3 in which a single particle of each electrode is shown on opposite sides of membrane 14 and connected to opposite sides of the power source 44. It is understood that the fluid flow can be in the same direction or in opposite directions on opposite sides of membrane 14, counter flow being preferred. The salt in the entering water is composed of sodium ions with a positive charge and chlorine ions with a negative charge. When an electric current is sent through the water flowing through the electrodes by closing switch 45, the negative chlorine ions in compartment 12 are drawn through membrane 14 toward the positive electrode particles 50. A chlorine ion 55 is shown passing through membrane 14. This action leaves excessive sodium cations ($Na^+$) which are adsorbed by the negative electrode particles 51. The additional electrons required to maintain electroneutrality are moved by the power source from particles 50 to particles 51, thereby releasing sodium ions from particles 50 into passage 11. However, the released sodium cations cannot pass through membrane 14 toward particles 51. A sodium ion 57 is shown leaving particle 50 and being stopped by membrane 14. The arrow 58 illustrates the direction of electron ($e^-$) flow. Thus, it can be seen that sodium and chloride ions are removed from water flowing in compartment 12 thereby producing product water, and that sodium and chloride ions are added to the water flowing in compartment 11 to produce brine. Referring to FIG. 1, the brine leaves compartment 11 through passage 17 and outlet passage 34 and the product water leaves compartment 12 through passage 18 and outlet 38.

In summary, the external power source drives electrons ($e^-$) into electrode 51 and extracts electrons from the other electrode 50. The electrode 51 adsorbs positively changed ions (cations) and the electrode 50 desorbs an equivalent number of cations. Electroneutrality is maintained by the flow of negatively charged ions (anions) through the anion permeable membrane 14. Thus, the interstitial water within the particles 51 is desalted (demineralized) while the mineralization of the interstitial water within particles 50 is increased. After a suitable period of time during which the respective stream of water through the two compartments are disposed of, the electric current is caused to be reversed by operation of switch 45 and the process is repeated with a corresponding reversal of the desalting effects in the two compartments. The sodium ions which were previously absorbed on particles 51 are now desorbed by particles 51, and sodium ions are now adsorbed by particles 50 so that the compartment 11 now produces product water and compartment 12 produces brine. Switch reversal should take place when the current density has declined with time to an inacceptable level because of the exhaustion of the finite capacity of the electrodes to absorb and desorb cations.

The direction of the counterflow of water through compartments 11 and 12 can be reversed if desired by simply moving the two-way valves 20 and 21 into their alternate positions in which the passages assume the dashed line positions shown in FIG. 1. This introduces fresh water into the compartment which was previously producing brine and serves to wash the brine from the compartment, after which product water is produced in this compartment.

Figure 4:
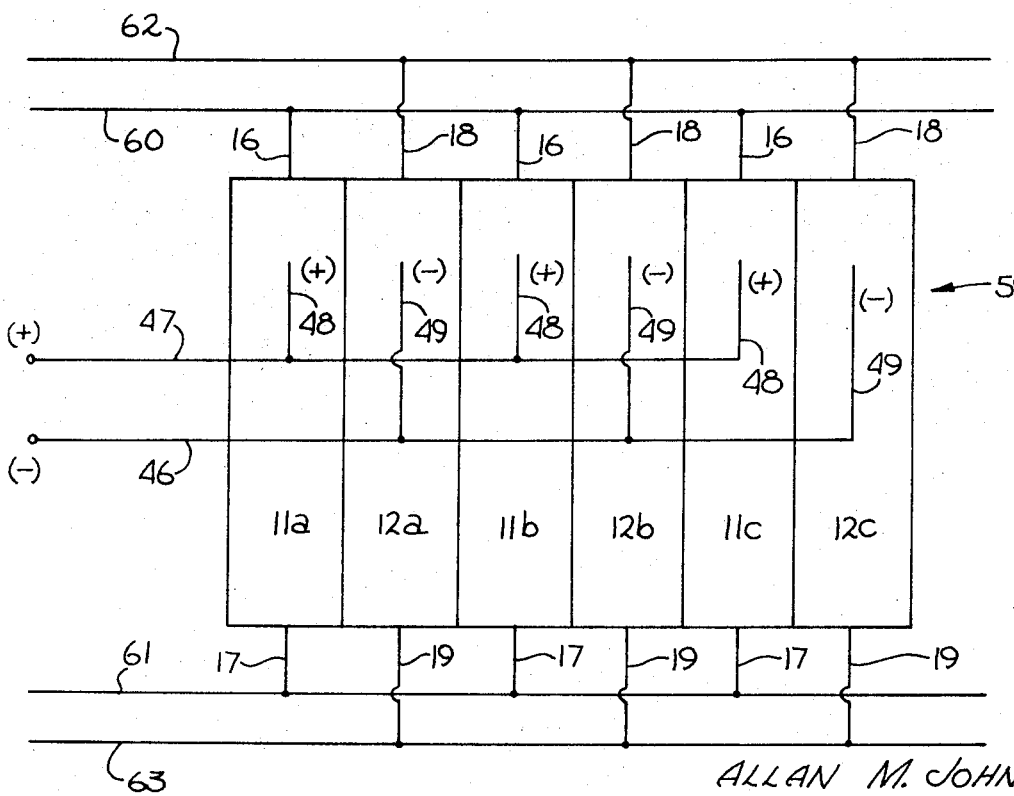
FIG. 4 is a diagrammatic illustration of a stack of similar electrodes which are separated by the same type of membranes.

A stack 59 of electrodes is illustrated in FIG. 4 with one set of alternate electrodes designated 11a–11c and the other set of alternate electrodes designated 12a–12c. The wires 48 for electrodes 11a–11c are connected to lead 47 electrically in parallel and the wires 49 for electrodes 12a–12c are connected to lead 46 electrically in parallel. The passages 16 and 17 leading from opposite sides of compartments 11a–11c connect to manifolds 60 and 61, respectively, leading to valves 20 and 21, respectively. In a similar manner, passages 18 and 19 of compartments 12a–12c connect to manifolds 62 and 63, respectively, leading to valves 20 and 21, respectively. It is apparent that the number of compartments in stack 59 can be varied to vary the quantity of product water produced.

Figure 5:
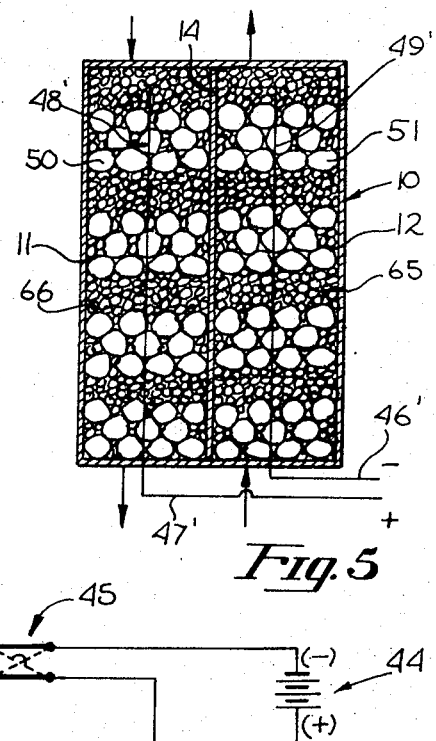
FIG. 5 is a schematic illustration similar to FIG. 2 showing anion responsive beads interspersed between the cation responsive particles of each electrode.

The structure of the electrodes can be modified by mixing anion exchange resin particles within the macropores or interstitial spaces in the porous carbon electrodes. The anion exchange resin or equivalent materials provide the equivalent of augmenting the surface area of the anion permeable membrane so that anions are more effectively transported away from the sites where cations are adsorbed. As illustrated in FIG. 5, anion exchange resin beads 65 are interspersed between the cation responsive particles 51 in space 12 and anion exchange resin beads 66 are interspersed between the cation responsive particles 50 in space 11. The particles and beads can be loaded alternately into each compartment so that the anion responsive beads tend to form layers between the cation responsive particles and some of the beads move into the spaces between the particles, as illustrated. The electrical leads 48' and 49' extend almost completely through the compartments 11 and 12, respectively, in order to provide electrical contact with all the particles 50 and 51 in the compartments. The beads provide the anions with increased mobility to move through the water toward the membrane 14, while the cations move to the nearby carbon particles. Anions can go through the beads faster than through water to reach the membrane, and the beads do not have to be in contact to increase movement of anions. As an example, the carbon particles 50, 51 and the beads 65, 66 in FIG. 5 could be approximately one-eighth inch and one-sixteenth inch in diameter, respectively. The beads can be fabricated of plastic material which is treated to be anion responsive and can be of any shape. In the event that the electrodes comprise anion responsive particles and the membrane is permeable to cations, then cation responsive beads would be interspersed between the anion responsive particles to aid the movement of cations toward the membrane.

Figure 2A:
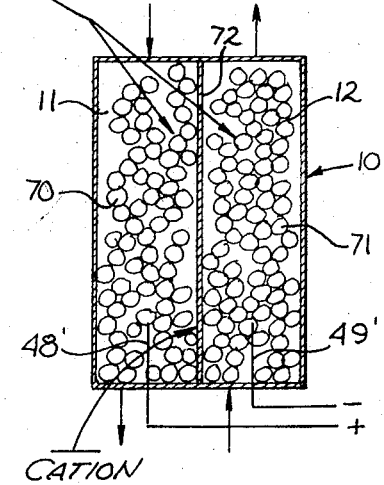
FIG. 2a is a reduced schematic illustration similar to FIG. 2 showing the two electrodes formed of anion responsive carbon particles and a cation permeable membrane therebetween.

While the operation of the invention has been described in connection with the removal of sodium and chloride ions, these ions are referred to only as illustrative of the operation of the invention since the invention also removes from brackish water other cations, such as $Ca^{++}$, $Mg^{++}$, and $K^+$, and other anions, such as $SO_4^-$, $HCO_3^-$ and $NO_3^-$. It is understood that the electrode particles in compartments 11 and 12 could be anion responsive and the membrane can be permeable to cations. As illustrated in FIG. 2a, the particles 70 and 71 in chambers 11 and 12, respectively, are anion responsive and the membrane 72 is permeable to cations. With such an arrangement, cations will flow through the membrane from one compartment to the other, and one electrode will absorb anions while the other electrode will desorb an equivalent number of anions. However, the degradation of the electrodes is toward the cation responsive form since an anion responsive electrode has a tendency to change into a cation responsive electrode. Therefore, this alternate arrangement is not as desirable as the first described arrangement of FIGS. 1-3 which utilizes cation responsive electrodes.

Conventional electrodialysis uses a large total voltage imposed across a stack of many membrane pairs so that the membranes are located in series across the potential source. When the electrodialysis apparatus is operating properly, there is substantially equal voltage drop across the plurality of membranes. However, in the event that scale is deposited on a membrane or a membrane is otherwise impaired, a large voltage drop will occur across this membrane and very little voltage drop will occur across the other membranes, resulting in inevitable destruction of the apparatus. Therefore, conventional electrodialysis stacks are potentially unstable and subject to being damaged or destroyed. In the present invention, the electrodes are in parallel in the electric circuit so that there is no possibility of a large voltage becoming imposed across a single membrane as the result of flow maldistribution or the deposition of scale on any membrane of any cell. In the present invention, one bad cell does not affect the others and does not create a situation that accelerates the destruction of the stack.

Also, as previously indicated, the present invention has the advantage over the process of U.S. Pat. No. 3,515,664 in that it produces double effect of the current. Assuming the same current flow per unit of electrode area and the same driving voltage, the present invention will produce in the neighborhood of twice the product water as would be produced with the same amount of power in the patented process since the present invention does not require a separate regenerative step. Further, the present invention requires only one kind of carbon electrode whereas the patented process requires two kinds. Therefore, the present invention has the advantage of simplification of inventory. Also, in the present invention, the single kind of carbon electrode is preferably cation responding which has durability superior to an anion responding carbon electrode which must also be used in the patented process. The utilization of only cation responding electrodes permits the present invention to operate at higher current densities.

What is claimed as new is:

1. In an apparatus for demineralizing an electrolyte fluid;
   a membrane permeable to either cations or anions but not to both;
   separate compartments on opposite sides of said membrane;
   means for connecting each compartment with said electrolyte fluid;
   each compartment containing an electrode responsive to counter ions of the opposite charge to those passing through said membrane, each electrode being permeable to permit the flow of said fluid therethrough; and
   means for applying a potential across said electrodes to cause one electrode to adsorb said counter ions and the other electrode to desorb said counter ions;
   electroneutrality being maintained by the passage of ions through said membrane, the mineralization of the fluid flowing through the adsorbing electrode being decreased and the mineralization of the fluid flowing through the desorbing electrode being increased.

2. In an apparatus as defined in claim 1, said membrane being permeable to anions and said electrodes being cation responsive.

3. In an apparatus as defined in claim 2 wherein the negative side of said potential applying means being connected to the adsorbing electrode and the positive side of said potential applying means being connected to the desorbing electrode.

4. In an apparatus as defined in claim 1, said membrane being permeable to cations and said electrodes being anion responsive.

5. In an apparatus as defined in claim 2 wherein the negative side of said potential applying means being connected to the desorbing electrode and the positive side of said potential applying means being connected to the adsorbing electrode.

6. In an apparatus as defined in claim 1 wherein each of said electrodes comprise carbon particles to which an ion exchange fluid material is applied and then polymerized to make insoluble.

7. In an apparatus as defined in claim 6 wherein the surface of said particles are first oxidized with an acid mixture.

8. In an apparatus as defined in claim 1 wherein said potential applying means comprises means for reversing the charge applied to said electrodes to reverse the adsorbing and desorbing action of said electrodes.

9. In an apparatus as defined in claim 1 wherein said potential applying means comprises a source of electrical potential, and separate wire terminals extending into each of said electrodes and connected to opposite sides of said potential source.

10. In an apparatus as defined in claim 1 wherein said connecting means comprise valve means for flowing said fluid in one direction through one of said electrodes and in the opposite direction through the other electrode.

11. In an apparatus as defined in claim 1 wherein each of said electrodes comprises particles having beads interspersed therebetween responsive to ions of the same charge as pass through said membrane.

12. In an apparatus as defined in claim 2 wherein each of said electrodes comprises cation responsive particles, and anion exchange beads smaller than said particles and interspersed between said particles to increase the mobility of anions toward said membrane.

13. In an apparatus as defined in claim 11 wherein said particles and beads are disposed in said compartment in substantially layer form with said beads also interspersed between said particles.

14. In an apparatus as defined in claim 13 wherein said potential applying means comprises a wire terminal in each compartment, each terminal being in electrical contact with all said particles in said compartment.

15. In an apparatus as defined in claim 1 wherein said connecting means comprise valve means for reversing the direction of flow of said fluid through said electrodes.

16. In an apparatus as defined in claim 1 having a plurality of membranes in addition to said one membrane to form a stack of membranes, each of said membranes having a compartment on each side thereof containing a permeable electrode responsive to counter ions, means for connecting all said compartments to said fluid, said potential applying means comprising a plurality of positive terminals connected in parallel to all the electrodes in a set on one side of said membranes and a plurality of negative terminals connected in parallel to all the electrodes in another set on the other side of said membranes.

17. In an apparatus as defined in claim 16 wherein said potential applying means comprises means for reversing the charge on said electrodes.

18. In an apparatus as defined in claim 16 wherein said connecting means comprise valve means for reversing the direction of flow of said fluid through all of said electrodes.

* * * * *